United States Patent
Seguin et al.

(10) Patent No.: US 6,974,266 B2
(45) Date of Patent: Dec. 13, 2005

(54) OPTICAL COMPONENT PACKAGING DEVICE

(75) Inventors: François Seguin, Montreal (CA); Pierre Martineau, Deux-Montagnes (CA); Denis-Alexandre Brulotte, Montreal (CA); Patrick Cigana, Montreal (CA); Pascal Octeau, Ile Perrot (CA); Xavier Daxhelet, Montreal (CA); Sébastien Allard, Laval (CA)

(73) Assignee: ITF Optical Technologies Inc., Montreal (CA)

( * ) Notice: Subject to any disclaimer, the term of this patent is extended or adjusted under 35 U.S.C. 154(b) by 53 days.

(21) Appl. No.: 10/635,637

(22) Filed: Aug. 7, 2003

(65) Prior Publication Data

US 2004/0052481 A1   Mar. 18, 2004

(30) Foreign Application Priority Data

Sep. 18, 2002   (CA) .................................. 2404093

(51) Int. Cl.⁷ ............................................... G02B 6/36
(52) U.S. Cl. ............................. 385/94; 385/92; 385/68
(58) Field of Search .............................. 385/94, 92, 68, 385/56

(56) References Cited

U.S. PATENT DOCUMENTS

| | | | |
|---|---|---|---|
| 4,119,363 A | 10/1978 | Camlibel et al. | |
| 4,387,505 A * | 6/1983 | Shay ........................ | 29/623.1 |
| 4,389,086 A | 6/1983 | Furusawa et al. | |
| 4,444,458 A | 4/1984 | Stowe et al. | |
| 4,636,031 A | 1/1987 | Schmadel, Jr. et al. | |
| 4,657,346 A * | 4/1987 | Berry et al. ................ | 385/138 |
| 5,042,898 A | 8/1991 | Morey et al. | |
| 5,177,806 A | 1/1993 | Abbott et al. | |
| 5,367,589 A | 11/1994 | MacDonald et al. | |
| 5,475,784 A | 12/1995 | Bookbinder et al. | |
| 5,514,360 A | 5/1996 | Sleight et al. | |
| 5,606,635 A * | 2/1997 | Haake ........................ | 385/53 |
| 5,664,040 A | 9/1997 | Kramer et al. | |
| 5,689,608 A | 11/1997 | Moore et al. | |
| 5,694,503 A | 12/1997 | Fleming et al. | |
| 5,757,540 A | 5/1998 | Judkins et al. | |
| 5,781,677 A | 7/1998 | Jin et al. | |
| 5,841,920 A | 11/1998 | Lemaire et al. | |
| 5,881,198 A * | 3/1999 | Haake ........................ | 385/136 |
| 5,936,494 A * | 8/1999 | Pollock ...................... | 333/252 |
| 5,987,200 A | 11/1999 | Fleming et al. | |
| 5,991,483 A | 11/1999 | Engelberth | |
| 6,044,189 A | 3/2000 | Miller | |

(Continued)

FOREIGN PATENT DOCUMENTS

EP   1 265 085 A1   12/2002

(Continued)

*Primary Examiner*—Kaveh Kianni
(74) *Attorney, Agent, or Firm*—George J. Primak; Louis Tessler (57) ABSTRACT

A packaging device for protectively enclosing an optical component in a substantially clean and anhydrous environment without imparting undue mechanical stresses on the optical component and adjacent segments of optical fiber coupled thereto. An intermediate component is used in combination with a sealing material for sealing the fiber aperture of a protective housing while allowing an optical fiber to extend therethrough. The protective housing is made out of a material having a coefficient of thermal expansion that closely matches that of the optical fiber. A chain of material CTE that includes the CTE of the intermediate component is used in order to circumvent the need for a sealing material having a high melting temperature. The packaging device is also designed so as to reduce water ingress by optimizing the configuration of the sealing component and adjacent structures.

26 Claims, 4 Drawing Sheets

U.S. PATENT DOCUMENTS

| | | |
|---|---|---|
| 6,101,301 A | 8/2000 | Engelberth et al. |
| 6,106,161 A | 8/2000 | Basavanhally et al. |
| 6,112,553 A | 9/2000 | Poignant et al. |
| 6,147,341 A | 11/2000 | Lemaire et al. |
| 6,178,278 B1 | 1/2001 | Keller et al. |
| 6,181,851 B1 | 1/2001 | Pan et al. |
| 6,233,382 B1 | 5/2001 | Olson et al. |
| 6,244,756 B1 | 6/2001 | Bloom |
| 6,307,990 B1 | 10/2001 | Carberry et al. |
| 6,327,405 B1 | 12/2001 | Leyva et al. |
| 6,370,310 B1 | 4/2002 | Jin et al. |
| 6,374,015 B1 | 4/2002 | Lin |
| 6,377,727 B1 | 4/2002 | Dariotis et al. |
| 6,393,181 B1 | 5/2002 | Bulman et al. |
| 6,453,092 B1 * | 9/2002 | Trentelman .................. 385/37 |
| 6,453,108 B1 | 9/2002 | Sirkis |
| 6,477,309 B2 | 11/2002 | So |
| 6,526,212 B1 * | 2/2003 | Mishriky et al. ........... 385/138 |
| 2002/0076175 A1 | 6/2002 | Centanni et al. |
| 2002/0110344 A1 * | 8/2002 | Jin .............................. 385/138 |
| 2002/0118922 A1 | 8/2002 | Long |
| 2002/0141700 A1 | 10/2002 | Lachance et al. |
| 2002/0150335 A1 | 10/2002 | Lachance et al. |
| 2002/0179683 A1 * | 12/2002 | Carrier et al. ............... 228/133 |
| 2002/0181909 A1 * | 12/2002 | Grunbeck et al. .......... 385/123 |

FOREIGN PATENT DOCUMENTS

| | | | |
|---|---|---|---|
| WO | WO 98/59267 | 6/1998 | |
| WO | WO 00/72059 A1 | 11/2000 | |
| WO | WO 02/052320 A1 | 7/2002 | |
| WO | WO 02/052320 A1 * | 7/2002 | ............ G02B 6/34 |

* cited by examiner

OPTICAL COMPONENT PACKAGING DEVICE

FIELD OF THE INVENTION

The present invention relates to the general field of packaging devices and is particularly concerned with a packaging device for protectively enclosing optical components that are optically coupled to strips of optical fiber.

BACKGROUND OF THE INVENTION

The use of optical fibers for various telecommunication systems and other applications has become increasingly prevalent. It has led to the creation of a whole burgeoning industry over the past few years. In the foreseeable future the field of fiber optics is expected to experience a quantum leap in both stature and product diversification.

As is well known in the art, optical fibers are typically hair thin structures, capable of transmitting light signals at relatively high rates and with relatively low signal loss. They are believed to be ideally suited to the high requirements of digital transmission and, hence, are well matched to the evolving worldwide data transmission network.

In order to achieve efficient optical fiber data transmission networks, various types of so-called optical components and devices have been developed. Examples of optical components and devices commonly used in optic communication systems and instrumentation include couplers, wavelength division multiplexers/demultiplexers, filters, attenuators, filter switches, isolators and so forth.

Some optical components are particularly vulnerable to mechanical stresses. In certain instances, this vulnerability is directly linked to the inherent structure of the optical component. Indeed, some optical components being made of modified glass fibers, they are characterized by an inherent brittleness that can lead to mechanical failure. The adjacent sections of optical fibers coupled to the optical components are also often particularly vulnerable to mechanical stress, especially if they have been locally stripped of their protective coating.

Aside from potentially causing breakage of the optical component and/or the adjacent sections of optical fiber attached thereto, bending or other mechanical stresses imposed thereon may potentially cause degradation of optical performances by inducing changes in optical signal strength and content.

Accordingly, for a given optical component to function reliably in practical environments, it is conventionally enclosed in a generally rigid protective casing or housing. Each strip of optical fiber coupled to the optical component extends out of the housing through a corresponding fiber aperture formed in the housing. A sealing component or assembly is sometimes used to seal the spacing between the peripheral edge of the fiber aperture and the peripheral surface of the fiber extending therethrough.

The combination of the rigid housing and of the sealing component or assembly is often referred to in the art as an optical component package. These optical component packages protect the optical components and adjacent strips of optical fiber attached thereto during both installation and operation.

Some optical components such as certain types of couplers are also particularly sensitive to environmental influences including hostile temperatures, radiation and contact with so-called contaminants such as the hydroxyl ion [OH] associated with water. Moisture in particular may prove to be detrimental to some optical components for several reasons.

For example, because of their inherent thermal motion, the oxygen and hydrogen atoms in the hydroxyl ion [OH] vibrate at 2.73 $\mu$m and produce a relatively large absorption loss at this wavelength. Of course, 2.73 $\mu$m is outside of the band where fibers are typically used and the loss peak at this wavelength is of relatively minor significance. However, unfortunately, overtones of this wavelength produce three loss peaks within the 700 to 1600 nm band, and these can interfere with signal transmission.

Moisture also tends to exaggerate surface flaws and, hence, lower tensile strength of the optical component and strips of optical fiber coupled thereto. Furthermore, when exposed to gaseous hydrogen, some optical components show an increase in optical loss that can be either temporary or permanent, depending on whether the hydrogen simply diffuses into the component and then leaves, or remains long enough to react chemically with the fiber.

Accordingly, most optical component packages are provided with housings made of generally contaminant impervious material. One of the main sources of contaminant ingress within the protective housing of prior art optical component packages remains the interface between the fiber aperture peripheral edge and the outer surface of the section of fiber extending through the fiber aperture.

Some prior art packages include housing tubes made of stainless steel or other suitable material. The housing tubes are typically used both as protective covering and as a support for the optical component. Typically, the housing longitudinal ends define fiber apertures that are generally oversized relative to the fiber diameter. A relatively large spacing is hence formed between each fiber aperture peripheral edge and corresponding fiber outer surface.

Various methods for providing a seal against contaminants between the fiber aperture peripheral edge and the adjacent fiber outer surface are disclosed in the prior art. For example, when a relatively large spacing is defined between a fiber aperture peripheral edge and a corresponding fiber outer surface the spacing is sometimes filled with a relatively short sealing plug made of an epoxy-based material. The epoxy-based material is typically applied at both ends of the tube not only to act as a seal but also to secure the sections of optical fiber extending from the tube.

One of the main drawbacks associated with the hereinabove mentioned type of prior art optical component packages is that the relatively short and wide epoxy-based sealing plugs typically do not provide an efficient barrier against moisture ingress into the tube ends. Indeed, it is well known that the physical characteristics of cured epoxies are such that they have a tendency to absorb and allow ingress of moisture.

One of the design-modifiable factors regulating the diffusion of humidity through epoxy plugs is the surface over length (A/L) ratio of the opening to be sealed. In order to reduce water ingress, the housing should preferably be designed so as to minimize the A/L ratio. Most prior art packaging devices using silicone sealing plugs however are not designed so as to reduce the A/L ratio and, hence, offer relatively poor protection against humidity ingress.

Another main drawback associated with the hereinabove disclosed type of prior art optical component packages is that the optical component and at least a section of the optical fiber attached thereto are often susceptible of being subjected to mechanical stresses if the optical component package is subjected to temperature variations. Temperature variations may prove to be particularly deleterious in situations wherein the optical component and/or the strips of optical fiber attached thereto are solidly anchored at spaced apart locations to a rigid sealing component and to a fixed mounting fixture within the housing.

In many applications employing optical components or devices, design specific mounting fixtures are utilized to precisely position, align or secure the strips of optical fiber to the optical components or devices. In this respect, maintaining the stability and relative position of optical fibers, components and devices, through the correct choice of materials, is particularly critical in that even minor relative movements between such elements may result in large variations or degradation in optical characteristics.

The thermally induced mechanical stresses to which some optical components are subjected to are typically imputable to the mismatch between the coefficients of thermal expansion of the various components involved. Indeed, as is well known, when two dissimilar materials are joined together and subjected to thermal cycling, the difference in their coefficients of thermal expansion can induce relatively large structural stresses. Furthermore, depending on the exact geometry and material distribution, the induced structural stress fields, although often transient, may be quite complex. Some thermally induced stress concentration points may potentially damage relatively fragile microstructures.

In an attempt to reduce these thermally induced mechanical stresses, some prior art optical component packages have been designed with a protective housing made out of a material having a coefficient of thermal expansion generally similar to that of the optical fiber. However, the sealing plugs and the fiber to which they are bound typically remain made out of generally dissimilar classes of material, namely a polymeric material such as epoxy and a glass-based material such as silica leading to thermally induced mechanical stresses. These thermally induced mechanical stresses are susceptible of exceeding the adhesion strength of the seal, hence potentially resulting in delamination during thermal cycling.

Other types of prior art optical component packages have resorted to using relatively resilient materials such as silicone for forming the sealing plug and/or the fiber-to-housing attachment component. The more resilient materials provide the advantage of being less susceptible of generating localized thermally induced mechanical stresses since they allow for a certain degree of deformation and hence act as decoupling components.

However, the use of silicone is associated with some important drawbacks such as a relatively poor sealing efficiency. Indeed, sealing plugs made out of silicone may not form strong chemical bonds with the outer surface of the optical fiber. Furthermore, silicone releases cyclosiloxane, a contaminant known to induce drift or wavelength shift in the optical components.

In order to circumvent some of the hereinabove mentioned problems associated with some common types of prior art optical component packages, sealing of the housing fiber apertures is sometimes carried out by a conventional soldering operation. To this purpose, it is necessary to first remove the acrylate coating from the section of the fiber extending through the fiber aperture. The uncoated fiber length is then carefully cleaned and surface-metallized For example, in a conventional metalization step, an inner layer made of titanium or chrome is typically bound to the outer surface of the fiber. This first layer is then typically covered by an intermediate layer of nickel or platinum and by an outer coating of gold in order to ensure appropriate wettability of the fiber by the solder.

Although solder seals are generally considered as being relatively efficient in preventing contaminant ingress, they nevertheless suffer from numerous drawbacks. The surface metalization process is both tedious and time consuming. Also, the solder surface-metallized portion of the fiber typically exhibits a relatively low tensile strength. This reduction in the tensile strength of the surface metallized portion may result from factors inherent to the process including the creation of micro-cracks during the removal of the fiber coating and stresses generated during both metalization and soldering steps.

Another type of sealing structure disclosed in the prior art for sealing the fiber apertures of packaging housings is commonly referred to as a glass-seal structure. Glass seal structures rely on glass-based material as the sealing agent. Some of the glass-seal structures suffer from the same drawbacks as the hereinabove disclosed other types of seals. In particular, some of the prior art glass-seal structures suffer from drawbacks associated with mismatches between the coefficient of thermal expansion of the sealing plug and of the housing protecting the fiber.

However, the prior art has shown at least one example of a glass-seal structure advantageously using the discrepancy between the coefficient of thermal expansion of the sealing plug and of the housing for creating a relatively hermetic compressive sealing joint at operational temperatures. U.S. Pat. No. 5,664,040, naming Daniel P. Kramer and Thomas M. Beckman as inventors, issued Sep. 2, 1997 discloses an assembly including a strip of optical fiber extending from a housing referred to as a metal holder. A so-called sealing medium made of glass sealingly engages the metal holder to the fiber.

The components are selected to be of material having compatible thermal expansion coefficients (TEC). More specifically, the TEC of the metal holder is greater or equal to the TEC of the sealing glass. The TEC of the sealing glass is, in turn, greater or equal to the TEC of the optical fiber. Manufacturing of the assembly involves heating the sealing glass until the latter attains a molten state. The sealing glass is then allowed to cool while in an intermediate position between the metal holder and the optical fiber so as to form a relatively hermetic compressive and solid seal therebetween.

Although the glass-seal structure disclosed in U.S. Pat. No. 5,664,040 at least partially solves some of the hereinabove mentioned drawbacks associated with other prior art sealing structures, it nevertheless inherently suffers from other drawbacks prohibiting its use in certain settings.

Indeed, since the sealing material used is a glass-based material, the softening temperature of the latter is inherently relatively high. The document mentions the use of a sealing glass preferably having a softening temperature in the range of about 700° C. to 900° C. This inherently relatively high softening or temperature may prove to be unacceptable in certain settings, for example when heat sensitive optical components are packaged especially if thermally sensitive adhesives are also used in the package.

Furthermore, glass-based sealing materials have also been associated with the release of contaminants during reflow. These contaminants may potentially induce drift or wavelength shift in the optical components. Accordingly, there exists a need for an improved optical component package.

SUMMARY OF THE INVENTION

It is a general object of the present invention to provide an improved packaging device for protectively enclosing an optical component in a substantially clean and anhydrous environment without imparting undue mechanical stresses on the optical component and adjacent segments of optical fiber coupled thereto.

The present invention proposes the use of a so-called intermediate component for solving some of the drawbacks associated with prior art optical component packaging devices. The intermediate component is used in combination with a sealing material for sealing the fiber aperture of a protective housing while allowing an optical fiber to extend through the fiber aperture with a minimal amount of stress imposed thereon.

The protective housing is typically made out of a material having a coefficient of thermal expansion that closely matches that of the optical fiber so as to allow the optical component and/or segments of optical fiber to be rigidly secured without increasing the risks of creating thermally induced mechanical stresses on the optical fiber even when the packaging device and its content are subjected to temperature variations.

In order to provide an efficient compressive seal having reduced risks of delaminating during thermal cycling, the present invention proposes the use of a chain of material CTEs that includes the CTE of the intermediate component. The use of an intermediate component having a predetermined CTE allows for localized CTE management with reduced risks of inducing stress on the optical component. The CTE of the optical fiber is chosen so as to be not greater than the CTE of the sealing material and the CTE of the sealing material is chosen so as to be not greater than the CTE of the structure surrounding the sealing material, in this case, the intermediate component instead of the housing.

Indeed, since the CTE of optical fibers are typically relatively low and since the protective housing is made out of a material having a CTE that closely matches that of the optical fiber, the CTE of the sealing material would have needed to be relatively low if the present invention did not include an intermediate component. Sealing components having a relatively low CTE are however characterized by inherently relatively high softening temperatures, hence requiring relatively high processing temperatures that could potentially lead to damaging of the optical component during packaging of the latter.

The use of an intermediate component having a GTE greater than that of the housing and positioned so as to surround the sealing material hence allows for the creation of a seal using a chain of GTE preventing delaminating during thermal cycling but without requiring a high sealing material melting temperature that could potentially damage some optical components during packaging of the latter. The use of an intermediate component having a GTE greater than that of the housing also allows for the creation of a relatively seal-tight compressive joint at the interface between the intermediate component and the housing.

The use of the intermediate component further allows for manufacturing of the proposed packaging device through a set of relatively simple and quick steps using conventional materials so as to provide a packaging device that is economically feasible. Furthermore, the proposed packaging device is manufactured using materials that are relatively chemically stable and that are generally not associated with out gassing of cyclosiloxane or other contaminants.

The proposed packaging device is designed so as to allow for its sealing components to be made out of widely available thermally curable epoxy. The epoxy is preferably mixed with an ultra-low or a negative CTE filler so as to obtain the desired CTE chain and, hence, again reduce the risks of imparting thermally induced mechanical stresses on the optical fiber.

The proposed packaging device is also specifically designed so as to reduce water ingress generally associated with the use of epoxy by optimizing the configuration of the sealing component and adjacent structures. More specifically, the packaging device is designed so as to minimize the ratio of transversal cross-sectional area to the length of the sealing component in order to reduce water diffusion through the epoxy seal. Furthermore, at least a section of the optical fiber interfacing with the sealing component is preferably deprived of its protective coating so that the sealing component may contact the bare fiber in order to eliminate the risks of contaminant ingress through the fiber protective coating.

Conveniently, the proposed packaging device is provided with an aligning holder or substrate designed so as to reduce possible misalignment between the optical component, segments of optical fiber coupled thereto and the housing. Maintaining proper alignment between these components further reduces the risks of imparting mechanical stresses on the optical component and/or segments of optical fiber coupled thereto.

In accordance with an embodiment of the present invention, there is provided an optical component packaging device in combination with an optical component optically coupled to a strip of optical fiber, the strip of optical fiber defining a fiber longitudinal axis, the strip of optical fiber being made of an optical fiber material defining an optical fiber coefficient of thermal expansion, the strip of optical fiber including a fiber core surrounded by a fiber cladding coated with a protective jacket, the strip of optical fiber defining a fiber outer surface, the optical component packaging device comprising: a housing, the housing defining a housing peripheral wall encompassing a housing inner volume, the housing peripheral wall having a housing aperture extending therethrough and leading into the housing inner volume, the housing being made of a housing material defining a housing coefficient of thermal expansion; an intermediate component, the intermediate component being substantially sealingly attached to the housing so as to cover the housing aperture, the intermediate component being made of an intermediate component material defining an intermediate component coefficient of thermal expansion, the intermediate component being provided with a generally encompassing intermediate component channel extending therethrough, the intermediate component channel defining an intermediate channel inner surface and an intermediate channel longitudinal axis; the housing aperture and the intermediate component channel being configured, sized and positioned so as to allow the strip of optical fiber to extend from a position located inside the housing inner volume to a position located outside the packaging device while defining a fiber-to-channel spacing between the fiber outer surface and the intermediate channel inner surface; a sealing component in sealing contact with both the fiber outer surface and the intermediate channel inner surface, the sealing component being made of a sealing component material defining a sealing component coefficient of thermal expansion, the sealing contact of the sealing component with both the fiber outer surface and the intermediate channel inner surface being facilitated by the relationship between the sealing component, the intermediate component and the optical component coefficients of thermal expansion.

In accordance with the present invention, there is also provided an optical component packaging device for protectively enclosing an optical component optically coupled to a strip of optical fiber, the strip of optical fiber defining a fiber longitudinal axis, the strip of optical fiber being made of an optical fiber material defining an optical fiber coefficient of thermal expansion, the strip of optical fiber including a fiber core surrounded by a fiber cladding coated with a protective jacket, the strip of optical fiber defining a fiber outer surface; the optical component packaging device comprising: a housing, the housing defining a housing peripheral wall encompassing a housing inner volume, the housing peripheral wall having a housing aperture extending therethrough and leading into the housing inner volume, the housing being made of a housing material defining a housing coefficient of thermal expansion; an intermediate component the intermediate component being substantially sealingly attached to the housing so as to cover the housing aperture, the intermediate component being made of an intermediate component material defining an intermediate component coefficient of thermal expansion, the intermediate component being provided with a generally encompassing intermediate component channel extending therethrough, the intermediate component channel defining an intermediate channel inner surface and an intermediate channel longitudinal axis; the housing aperture and the intermediate component channel being in communication with each other so as to allow the strip of optical fiber to extend from a position located inside the housing inner volume to a position located outside the packaging device; a sealing component in sealing contact with the intermediate channel inner surface, the sealing component being made of a sealing component material defining a sealing component coefficient of thermal expansion; the intermediate component coefficient of thermal expansion being greater than the sealing component coefficient of thermal expansion; whereby, the sealing component is in sealing contact with both the fiber outer surface and the intermediate channel inner surface, the sealing contact of the sealing component with both the fiber outer surface and the intermediate channel inner surface being facilitated by the relationship between the sealing component, the intermediate component and the optical component coefficients of thermal expansion.

Conveniently, the intermediate component channel defines a sealing section, the sealing section defining a sealing section opening area and a sealing section length, the ratio of the sealing section opening area to the sealing section length being minimized so as to reduce water ingress through the sealing component in the sealing section.

BRIEF DESCRIPTION OF THE DRAWINGS

An embodiment of the invention will now be described, by way of example, in reference to the following drawings in which.

DETAILED DESCRIPTION

Figure 3:
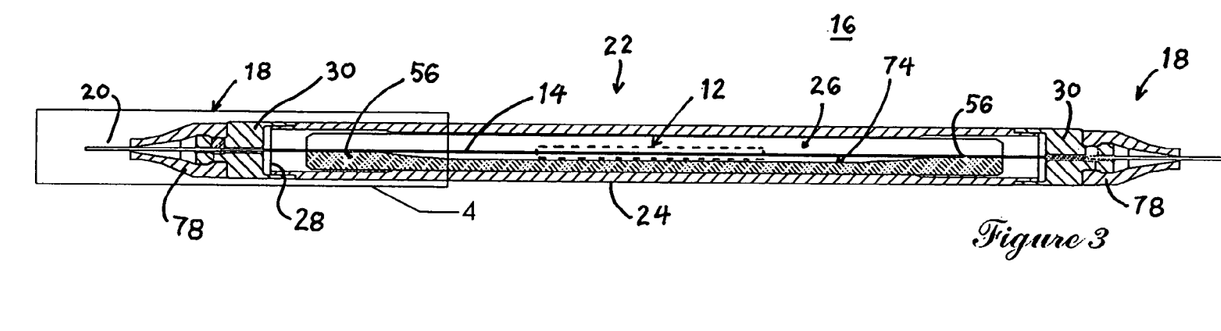
FIG. 3: in a longitudinal cross-sectional view taken along arrows III—III of FIG. 2, illustrates the relationship between some of the components of an optical component packaging device in accordance with an embodiment of the present invention, the device being shown protectively enclosing an optical component and strips of optical fiber coupled thereto.

Referring to FIG. 3, there is shown, in a longitudinal cross-sectional view, an optical component packaging device (10) in accordance with an embodiment of the present invention. The optical component packaging device hereinafter referred to as the packaging device (10) is intended to protectively enclose an optical component schematically illustrated in FIG. 3 and designated by the reference numeral (12).

The optical component (12) can be of any suitable type such as a coupler, a multiplexer/demultiplexer, a connector, a filter, a switch or any other optical component (12) requiring protection from the external environment. The optical component (12) is typically optically coupled to at least one so-called pigtail or strip of optical fiber (14) allowing the optical component (12) to be optically linked to the external environment (16).

In the embodiment illustrated in FIG. 3, the optical component (12) is shown coupled to a pair of strips of optical fiber (14) extending in substantially diametrically opposed directions relative to each other. Accordingly, the packaging device (10) is shown as having a generally elongated configuration defining a pair of packaging device longitudinal ends each provided with a corresponding sealing assembly (18).

It should however be understood that the packaging device (10) could be used for protectively enclosing an optical component (12) optically coupled to any suitable number of strips of optical fiber. For example, the optical component (12) optically could be coupled to a single strip of optical fiber (14), as exemplified in FIGS. 7a through 7c, or it could be coupled to numerous strips of optical fiber (not shown) without departing from the scope of the present invention. Also, it should be understood that the packaging device (10) could assume other geometrical configurations without departing from the scope of the present invention.

Each strip of optical fiber (14) has a generally elongated configuration defining a corresponding fiber longitudinal axis. As is well known in the art, each strip of optical fiber (14) typically includes a fiber core surrounded by a fiber cladding. The fiber cladding is typically coated with a protective jacket (20). Also, typically, each strip of optical fiber (14) is made out of an optical fiber material such as silica, defining a corresponding optical fiber coefficient of thermal expansion.

The packaging device (10) includes a housing (22) defining a housing peripheral wall (24). Although the housing peripheral wall (24) illustrated in FIGS. 1 through 6 is shown as having a generally cylindrical configuration, it should be understood that the housing peripheral wall (24) could assume other geometrical configurations without departing from the scope of the present invention.

The housing peripheral wall (24) generally encompasses a housing inner volume (26). As illustrated more specifically in FIG. 4, the housing peripheral wall (24) is provided with at least one housing aperture (28) leading into the housing inner volume (26). In the embodiment shown in FIG. 3, the housing apertures (28) and the inner volume (26) together form a generally elongated channel extending through the housing (22).

Furthermore, the channel is shown as having a generally constant and cylindrical cross-sectional configuration.

Figure 1:
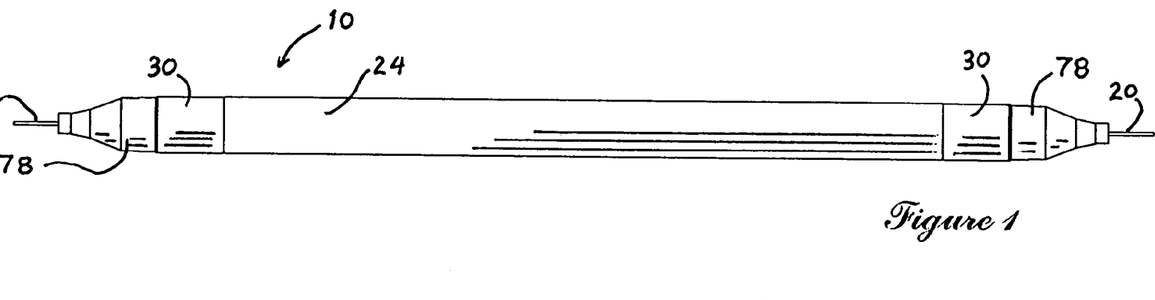
FIG. 1: in an elevational view, illustrates the external appearance of an optical component packaging device in accordance with an embodiment of the present invention, the device being shown with strips of optical fiber extending from longitudinal ends thereof.
Figure 2:
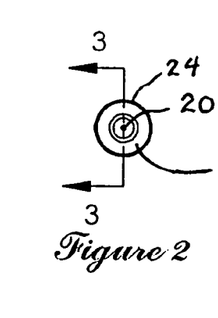
FIG. 2: in a side view of FIG. 1, illustrates the external appearance of an optical component packaging device in accordance with an embodiment of the present invention, the device being shown with a strip of optical fiber extending therefrom.

It should however be understood that the inner volume (26) could have other suitable configurations such as a generally spherical or otherwise shaped configuration and could again extend only partially through the housing (22) without departing from the scope of the present invention. Also, although the housing aperture (28) illustrated in FIG. 2 is shown as having a generally disc-shaped configuration, it should be understood that the housing aperture (28) could assume other configurations without departing from the scope of the present invention.

The housing peripheral wall (24) is made of a housing material defining a corresponding housing coefficient of thermal expansion. For reasons that are hereinafter disclosed in greater details, the housing coefficient of thermal expansion is preferably substantially similar to the optical fiber coefficient of thermal expansion. Typically, although by no means exclusively, the absolute coefficient of thermal expansion differential between the fiber coefficient of thermal expansion and the housing coefficient of thermal expansion has a value of approximately $3 \times 10^{-6}/°$ C. or less.

In one embodiment of the invention, the housing material is chosen as being INVAR 36 (™), a ferrous alloy containing 36% Nickel, traces of Manganese and possibly other components with the balance being Iron. As is well known in the art, the coefficients of thermal expansion for INVAR and glass are relatively similar in a temperature range between 50° Celsius and 150° Celsius while they diverge from one another above 225° Celsius.

Each housing aperture (28) is provided with a corresponding sealing assembly (18) for sealing the housing inner volume (26) and its content against contaminants and physical agents of the external environment (16). The sealing assembly (18) also allows a corresponding strip of optical fiber (14) to extend therethrough between the housing inner volume (26) and the external environment (16) without causing undue stresses on the content of the housing inner volume (26) including the optical component 12 and segments of the strip of optical fiber (14) attached thereto in the inner volume (26).

Each sealing assembly (18) includes a corresponding intermediate component (30). Each intermediate component (30) is substantially sealingly attached to the housing (22) so as to generally cover the housing aperture (28). In the context of a generally cylindrically-shaped housing peripheral wall (24), the intermediate component (30) typically takes the form of a component often referred to in the trade as a so-called end cap. It should however be understood that in other contexts, such as when the housing (22) and/or the housing aperture (28) have other configurations, the intermediate component (30) could assume a configuration other then that of an end-cap without departing from the scope of the present invention.

The intermediate component (30) is provided with a preferably generally encompassing intermediate component channel (32) extending therethrough. In the context wherein the intermediate component channel (32) assumes the form of an end-cap, the intermediate component channel (32) is often referred to in the trade as a feedthrough channel. The intermediate component channel (32) could have any suitable longitudinal and/or cross-sectional configuration without departing from the scope of the present invention as long as it defines an intermediate channel inner surface and an intermediate channel longitudinal axis.

The housing aperture (28) and the intermediate component channel (32) are configured, sized and positioned so as to allow the strip of optical fiber (14) to extend from a position located inside the housing inner volume (26) to a position located in the external environment (16). Also, the housing aperture (28) and the intermediate component channel (32) are configured, sized and positioned so as to define a fiber-to-channel spacing between the fiber outer surface and the intermediate channel inner surface when the strip of optical fiber (14) extends from the housing inner volume (26) to the external environment (16).

The intermediate component (30) is made of an intermediate component material defining a corresponding intermediate component coefficient of thermal expansion. For reasons that will be hereinafter disclosed in greater details, in a preferred embodiment of the invention, the intermediate component (30) is made out of Brass or a similar suitable material.

Each sealing assembly (18) is further provided with a sealing component (34) in sealing contact with at least a section of both the fiber outer surface and the intermediate channel inner surface. The sealing component (34) is made of a sealing component material having a corresponding sealing component coefficient of thermal expansion. Preferably, the sealing component (34) is of a meltable or curable type so as to present flowable characteristics facilitating its application in the intermediate component channel (32).

The sealing contact of the sealing component (34) with both the fiber outer surface and the intermediate channel inner surface resultsis facilitated by the relationship between the sealing component, the intermediate component and the optical fiber coefficients of thermal expansion.

Typically, the sealing contact of the sealing component with the fiber outer surface and the intermediate channel inner surface is facilitated, at least in part, by a compressive force exerted on the sealing component and generated by the relationship between the sealing component, the intermediate component and the optical component coefficients of thermal expansion. In other situations such as when a CTE mismatch exists, delamination forces are generated at the material interface creating tensile stress. In such situations, the sealing contact of the sealing component with the fiber outer surface and the intermediate channel inner surface is facilitated, at least in part, by a reduction in the tensile stress at the adhesion interface of the sealing component, the reduction in the tensile stress resulting, at least in part from the relationship between the sealing component, the intermediate component and the optical component coefficients of thermal expansion.

Hence, in some situations a compressive force exerted on the sealing component (34) may be required in order to achieve a sealing contact at its adhesion interfaces while in other situations a mere reduction of the tensile stresses at its adhesion interfaces may be considered sufficient. Various factors such as the geometry of the adhesion interface and the physical characteristics of the involved components may influence the choice of whether a compressive force or a mere reduction of the tensile stresses at the adhesion interfaces of the sealing component is considered suitable.

Preferably, the intermediate component coefficient of thermal expansion is greater or at least equal to the sealing component coefficient of thermal expansion that, in turn, is greater or at least equal to the optical fiber coefficient of thermal expansion. Typically, when the intermediate component coefficient of thermal expansion is equal to the sealing component coefficient of thermal expansion, the latter is, in turn, greater than the optical fiber coefficient of thermal expansion. Typically, when the intermediate component coefficient of thermal expansion is greater than the sealing component coefficient of thermal expansion, the latter is, in turn, greater or at least equal to the optical fiber coefficient of thermal expansion.

It should however be understood that the sealing component coefficient of thermal expansion could alternatively be smaller than the intermediate component coefficient of thermal expansion without departing from the scope of the present invention. In such situations however, the geometry of the sealing component and of the intermediate component is preferably designed so that the effective change in the space occupied by the sealing component is greater then the change produced by the sealing material coefficient of thermal expansion. In other words, in such situations, the geometry of the sealing and intermediate components is such that it compensates for a lesser change in sealing component volume during thermal cycling so as to still facilitate the formation of a seal-tight interface.

The chain of coefficients of thermal expansion allows for the creation of a sealing joint around the strip of optical fiber (14) when the packaging device (10) is in an external environment (16) wherein the temperature is maintained within a predetermined operational range. Typically, this predetermined temperature operational range varies between −40° and 85° Celsius. In order for the sealing contact to be established, the temperature operational range is chosen so as to extend below the curing or fusion temperatures of the sealing component. The curing or fusion temperatures of the sealing component is typically in the range of 120° Celsius.

In a preferred embodiment of the invention, the sealing component material is an epoxy-type adhesive. The epoxy-type adhesive is preferably chosen because of its ability to be readily cured and its relatively low cost. Rapid in-situ cure schedules are also possible, hence facilitating volume manufacturing. Epoxy adhesives are also characterized by their low out gassing of contaminants when compared, for example, to the widely used silicone adhesive that are known to be permeable to gaseous exchange and to release contaminants such as cyclosiloxane, possibly inducing optical component drifts.

In order to be able to use a commercially available conventional epoxy adhesive while preventing thermal variations from damaging the sealing joint, an ultra-low coefficient of thermal expansion or negative coefficient of thermal expansion filler material is added to the commercially available conventional epoxy adhesive. The filler material reduces the coefficient of thermal expansion of the epoxy-filler mixture. The proportion of filler material in the epoxy-filler mixture is preferably calibrated so that the coefficient of thermal expansion of the epoxy-filler mixture substantially approaches that of the intermediate component.

For example, when a conventional epoxy adhesive such as the adhesive sold under the trademark EPOTEK 353 ND is used, a filling material such as aluminum lithium silicate in proportions of 1.5 filler for 1 of epoxy is used. With such an epoxy-filler mixture, the coefficient of thermal expansion of the sealing component material is reduced from $430\times10^{-7}$ to $200\times10^{-7}/°$ C., hence, a coefficient of thermal expansion close to that of Brass. The use of a filler material thus reduces the risks of delaminating during thermal cycling resulting from a mismatch between the coefficients of thermal expansion.

Referring back to FIG. 4, there is shown that the intermediate component channel (32) preferably defines a sealing section (36) along at least a portion of which the sealing component (34) is generally in contact with the channel inner surface and in substantially encompassing contact with the fiber outer surface. The sealing section (36) preferably has a generally disc-shaped cross-sectional configuration although it could have other cross-sectional configurations without departing from the scope of the present invention.

Figure 4:
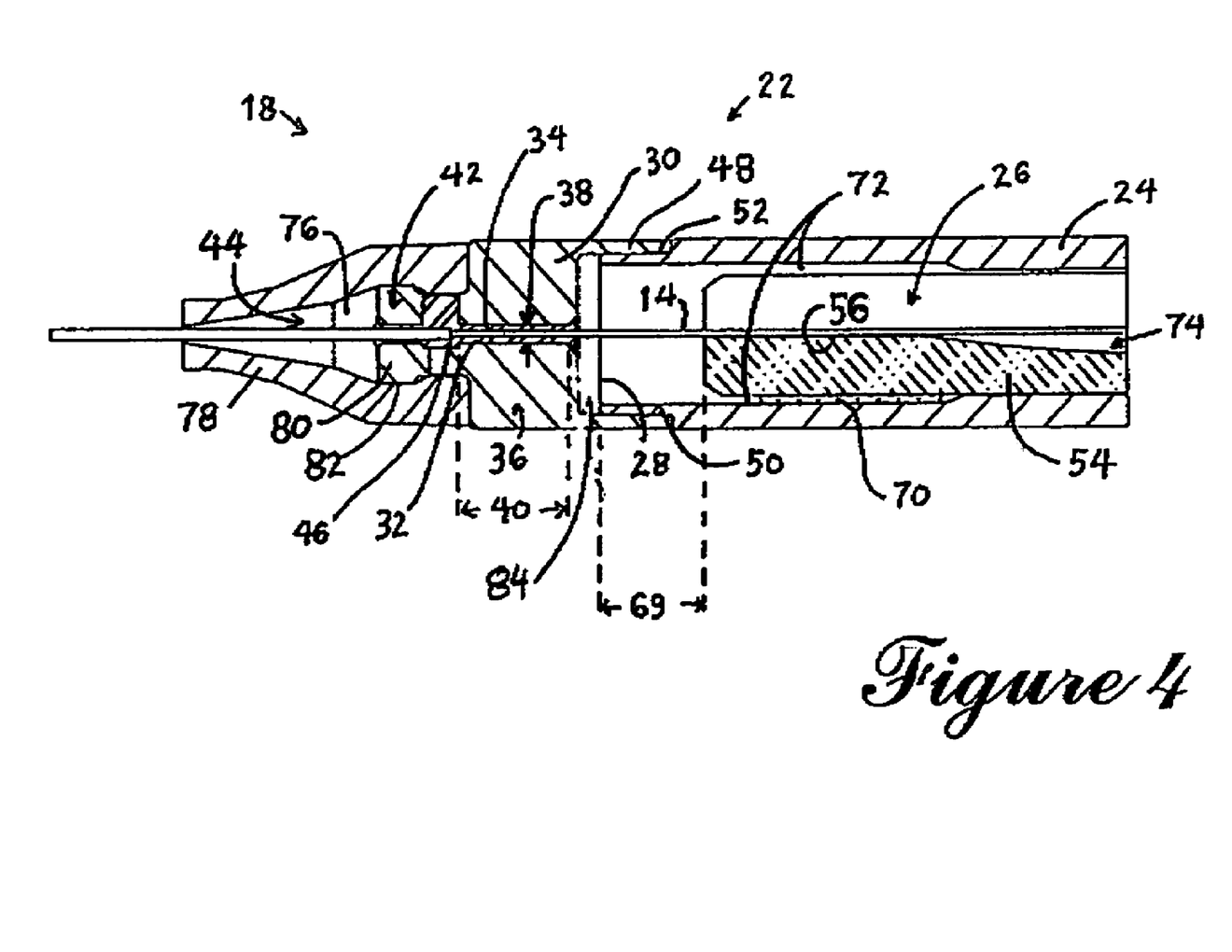
FIG. 4: in a partial longitudinal cross-sectional view taken from a close-up of FIG. 3, illustrates the relationship between some of the components of an optical component packaging device in accordance with an embodiment of the present invention, the device being shown with a section of an optical fiber extending therefrom.

The sealing section (36) defines a sealing section opening area indicated by the reference numeral (38) and a sealing section length, indicated by the reference numeral (40). For reasons that will be hereinafter disclosed, the sealing section opening area (38) is preferably sized at a minimal value taking into consideration the need for allowing insertion of the strip of optical fiber (14) and possible misalignments between the strip of optical fiber (14) and the longitudinal axis of the sealing section (36). Typically, the sealing section opening area (38) is sized so as to be as close as possible to the optical fiber external diameter. For the same reasons, the sealing section length (40) is conversely preferably sized so as to be as long as possible taking into consideration constraints such as the overall length of the packaging device (10) and minimization of the repercussions of a potential misalignment of the strip of optical fiber (14) relative to the longitudinal axis of the sealing section (36).

The ratio between the sealing section opening area (38) and the sealing section length (40) is thus preferably minimized taking into consideration other design criteria. Typically, although by no means exclusively, the ratio between the sealing section opening area (38) and sealing section length (40) has a value substantially in the range of 1/100 (typically 0.069) in suitable units. Minimization of the opening area to length ratio is intended to reduce the risks of humidity ingress into the housing inner volume (26).

Indeed, while epoxy adhesives offer a convenient solution for attaching optical fibers to other structures such as housings, the physical characteristics of cured epoxies are such that they have a tendency to absorb and allow ingress of moisture. The diffusion of humidity through epoxy joints can be approximated by the equation: $q = D \times \Delta X \times (A/L)$ wherein q is the humidity flow in $cm^3/s$, D is the diffusion coefficient in $cm^2/s$, $\Delta X$ is the humidity concentration gradient which is adimensional, and (A/L) is the surface over length ratio of the opening to be sealed in $cm^2/cm$. From the above equation, it can be deducted that the A/L ratio is preferably optimized in order to reduce humidity ingress. The intermediate component channel (32) thus defines a sealing section (36) over which the A/L ratio is optimized taking into consideration other design constraints.

Typically, the intermediate component channel (32) also defines an optional guiding section (42) extending from the sealing section (36). The guiding section (42) preferably extends generally outwardly in a substantially collinear relationship relative to the sealing section (36). The guiding section (42) typically helps in guiding the orientation of the strip of optical fiber (14) while providing a relatively weak seal.

Typically, the packaging device (10) is further provided with an optional sealing component insertion means for allowing insertion of the sealing component (34) into the intermediate component channel (32) during the manufacturing process. In the embodiment of the invention shown throughout the Figures, the sealing component insertion means includes an insertion channel (44) extending from a position located outside the packaging device (10) to a position wherein it merges with the guiding section (42). Typically, the insertion channel (44) extends transversally or radially into the guiding section (42). The insertion channel (44) allows the sealing component (34) to be injected or otherwise inserted into the intermediate component channel (32).

As mentioned previously, conventional strips of optical fiber (14) are typically provided with a protective jacket. However, urethane acrylates and most other coating materials used for forming a protective jacket over conventional strips of optical fiber (14) allow moisture to permeate therethrough. Accordingly, in order to further reduce the risks of moisture ingress into the housing inner volume (26), the strip of optical fiber (14) extending through the intermediate component channel (32) is preferably at least partially deprived of its protective jacket over at least a so-called jacketless section thereof. Preferably, this jacketless section is located in the sealing section (36).

The section of the strip of optical fiber (14) extending in the sealing section (36) is preferably deprived of its protective jacket over its full length so as to allow the sealing component (34) located in the sealing section (36) to sealingly contact the fiber cladding over a relatively large area. Optionally, the section of the strip of optical fiber (14) extending in the sealing section (36) could be deprived of its protective jacket over only a section of its length or an arc portion of its peripheral surface.

Preferably, the transitional location (46) between the section of optical fiber coated with a protective jacket and the jacketless section is positioned substantially in register with the insertion channel (44). The positioning of the transitional location (46) substantially in register with the insertion channel (44) ensures that a section of the coated fiber will also be in contact with the sealing component (34). The contact of the sealing component (34) with both a jacketed and a jacketless section of the strip of optical fiber (14) typically improves the overall side pull/cable retention performance of the sealing assembly (18).

In order to sealingly attach the intermediate component (30) to the housing peripheral wall (24) over the housing aperture (28), both the intermediate component (30) and the housing peripheral wall (24) are preferably provided respectively with a housing attachment section and an intermediate component attachment section. While the housing and intermediate component attachment sections may take any suitable form, they are typically configured, sized and positioned for abutting contact with at least a portion of each other. In one embodiment of the invention, the intermediate component attachment section takes the form of an intermediate component flange (48) extending from the intermediate component (30) while the housing attachment section takes the form of a housing flange (50) extending from the housing peripheral wall (24).

The intermediate component (30) is typically attached to the housing peripheral wall (24) by both a frictional force and a retaining pressure exerted between the intermediate component attachment section and the housing attachment section. The retaining pressure is, in turn, typically generated by both a mechanical interference resulting from a press-fit between the intermediate component attachment section and the housing attachment section and by a difference between the intermediate component coefficient of thermal expansion and the housing coefficient of thermal expansion.

In one embodiment of the invention, a compressive joint is achieved by means of an external press-fit wherein the intermediate component flange (48) substantially overrides the housing flange (50) and wherein the intermediate component coefficient of thermal expansion is greater than, or at least equal to, the housing coefficient of thermal expansion. Alternatively, the intermediate component and housing attachment sections could be attached together by conventional threads, a crimping mechanism, a slide fit or any other suitable means.

Gaps existing between the housing and intermediate component attachment sections are typically filled with a suitable sealing and adhesive material such as a thermally cured epoxy adhesive. In one embodiment of the invention, the intermediate component and housing attachment sections are configured so as to collaborate in creating a generally ring-shaped, cone-shaped or otherwise shapedfilling receiving volume (52) between the housing and intermediate component flanges (50), (48).

The filling receiving volume (52) is typically filled with a filling material such as a substantially sealing adhesive material like an epoxy adhesive. Alternatively, the filling material could include any suitable relatively compliant material such as a generally soft plating of indium or the like. The filling material is positioned in the filling receiving volume (52) so as to be in a substantially sealing contact with both the intermediate component attachment section and the housing attachment section. The filling material in the filling receiving volume (52) thus further improves the sealing action between the intermediate component and housing attachment sections.

The packaging device (10) preferably further includes an alignment means for aligning the strip of optical fiber (14) relative to the intermediate component channel (32) so that the fiber longitudinal axis remains in a generally parallel and preferably collinear relationship relative to the intermediate channel longitudinal axis. The alignment means typically includes a supporting component (54) such as a supporting block, a substrate or the like mounted within the housing inner volume (26). The supporting component (54) defines a supporting surface (56) for supporting a supported section of the strip of optical fiber (14).

Preferably, at least a portion of the supported section is secured to the supporting surface (56). As shown more specifically in FIG. 5, the strip of optical fiber (14) is preferably secured to the supporting surface (56) using both a first layer (58) of fiber-to-supporting component adhesive and a second layer (60) of fiber-to-supporting component adhesive. Typically, the supporting component (54) has a generally elongated configuration defining a pair of opposed supporting component longitudinal ends.

Figure 5:
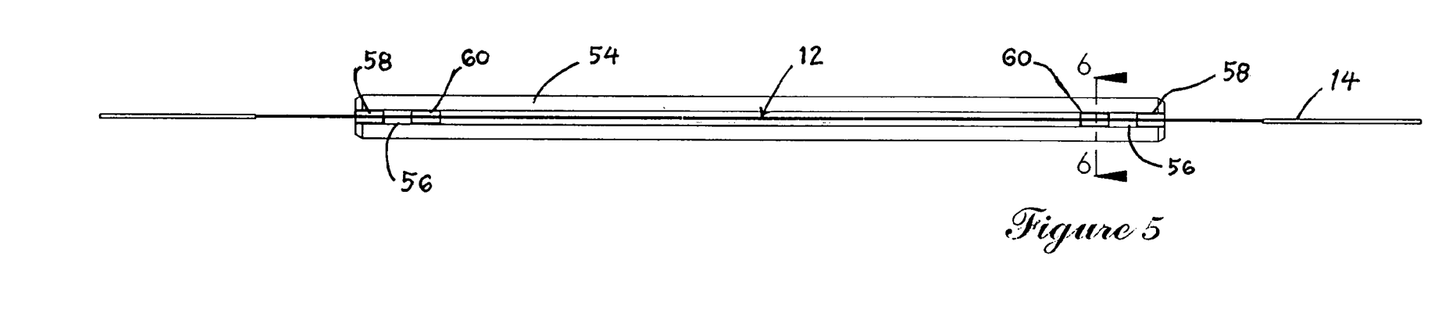
FIG. 5: in a top view, illustrates a substrate component optionally part of an optical component packaging device in accordance with an embodiment of the present invention, the substrate component being shown supporting an optical component and strips of optical fiber coupled thereto.

The first layer (58) is typically positioned generally adjacent to the second layer (60) and in a more proximal relationship relative to the supporting component longitudinal ends than the second layer (60). The first layer (58) is typically used for clamping the strip of fiber (14) to the supporting surface (56) during assembly. Typically, the adhesive used for forming the first layer (58) is an ultraviolet-curable adhesive. The adhesive used for forming the second layer (60) is typically a thermally curable epoxy adhesive.

The supporting component (54) is preferably made out of a material such as silica having a coefficient of thermal expansion substantially similar to the fiber coefficient of thermal expansion. The supporting component (54) may have various cross-sectional configurations without departing from the scope of the present invention. One possible example of a supporting component cross-sectional configuration is illustrated more specifically in FIG. 6.

Figure 6:
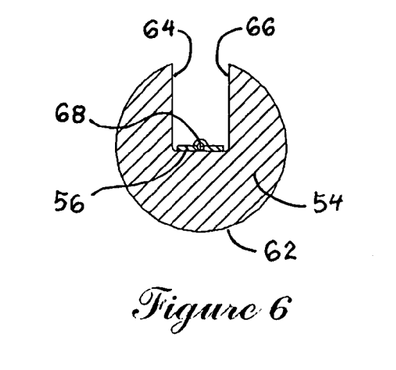
FIG. 6: in a transversal cross-sectional view taken along arrows VI—VI of FIG. 5, illustrates a substrate component optionally part of an optical component packaging device in accordance with an embodiment of the present invention, the substrate component being shown supporting an optical component and strips of optical fiber coupled thereto.

In the embodiment illustrated in FIG. 6, the supporting component (54) has a generally "U"-shaped cross-sectional configuration defining a generally flat supporting surface (56). The supporting component (54) defines a housing contacting surface (62) having a generally arcuate configuration so as to conform to the generally cylindrical configuration of the inner surface of the housing peripheral wall (24). A pair of supporting component flanges (64), (66) extends from the peripheral edges of the supporting surface (56).

FIG. 6 also illustrates that the fiber longitudinal axis (68) is maintained in a generally spaced relationship relative to the supporting surface (56) by the first and second layer (58), (60) of adhesive material. The fiber longitudinal axis (68) is positioned so as to be in a generally centered relationship relative to the intermediate component channel (32). Centering of fiber longitudinal axis in the intermediate component channel (32) reduces the risks of misalignment. Reducing the risks of misalignment, in turn, reduces the risks of stressing the strip of optical fiber (14). This consideration may prove to be particularly important in situations wherein the strip of optical fiber (14) is solidly anchored to both the intermediate component (30) and the supporting surface (56).

As shown more specifically in FIG. 4, the housing peripheral wall (24), the intermediate component (30) and the supporting component (54) are conveniently configured and sized so as to create a generally longitudinally extending supporting component-to-intermediate component spacing (69) between a supporting component longitudinal end and the adjacent end of a corresponding intermediate component channel (32). The strip of optical fiber (14) is typically rigidly attached, at a first location, to the supporting component (54) adjacent the supporting component longitudinal ends and, at a second location, to the sealing component (34) adjacent the proximal end of a corresponding intermediate component channel (32).

The supporting component-to-intermediate component spacing (69) allows for the two rigid fiber attachment locations to be spaced apart from each other. Spacing of these two rigid fiber attachment locations, in turn, reduces the strain imparted in the segment of optical fiber (14) between the two rigid fiber attachment locations in situations wherein a coefficient of thermal expansion mismatch exists between the supporting component (54) and the housing (22) and the packaging device (10) is subjected to thermal cycling.

In at least one embodiment of the invention, the supporting component (54) is optionally attached to the housing peripheral wall (24) decoupling attachment means allowing a relative movement between the supporting component (54) and the housing peripheral wall (24) in a direction substantially parallel to the fiber longitudinal axis (68). Typically, decoupling attachment means includes a supporting component-to-housing anchoring point or layer (70) of a suitable material, such as a generally resilient epoxy resin.

Mechanical decoupling between the supporting component (54) and the housing peripheral wall (24) reduces the creation of stresses on the strip of optical fiber (14) and associated optical component (12) attached thereto. Indeed, since the strip of optical fiber (14) is rigidly attached at spaced apart locations on the supporting surface (56) dimensional variation mismatches between the supporting component (54) and the housing peripheral wall (24) as a result of thermal and/or mechanical cycling could lead to stressing of the supporting component (54) and, hence, to stressing of the strip of optical fiber (14) and/or optical component (12). These stresses in the strip of optical fiber (14) and/or the optical component (12) attached thereto could, in turn, lead to loss of mechanical and/or optical integrity.

Preferably, the inner surface of the housing peripheral wall (24) defines a decoupling recess (72) for receiving the supporting component-to-housing layer (70) of adhesive material while allowing the supporting component (54) to be abuttingly supported by the remainder of the interior surface of the housing peripheral wall (24). Alternatively, as shown in FIG. 4, the design and configuration of the supporting component (54) may be modified in order to provide a centering support to the strip of optical fiber (14) while allowing for the positioning of a suitable layer of decoupling material. The material used for forming the supporting component-to-housing layer (70) of adhesive material is typically an epoxy-based adhesive. The use of an epoxy-based material as a decoupling material as compared with the use of other conventional decoupling agents such as silicone again reduces the emanation of contaminants such as cyclosiloxane that could impair optical properties.

The packaging device (10) is preferably further provided with a clearance section (74) formed in the supporting component (54) for allowing the optical component (12) and at least a section of the optical fiber (14) attached thereto to move in a direction substantially perpendicular to the fiber longitudinal axis (68). The clearance section (74) allows the optical component (12) and the adjacent sections of the strip of optical fiber (14) to deflect laterally over a predetermined range without contacting the supporting component (54) or adjacent structures.

As illustrated more specifically in FIGS. 3 and 5, in at least one embodiment of the invention, the supporting component (54) defines a pair of supporting surfaces (56) for supporting a corresponding pair of supported sections of the strip of optical fiber (14). The supporting surfaces (56) are in a spaced relationship relative to each other and define the clearance section (74) therebetween.

The strip of optical fiber (14) defines an unsupported section extending between the supported sections. The unsupported section is typically substantially in register with the clearance section (74). The clearance section (74) thus typically forms a recess in the supporting component (54). The recess in the supporting component (54) is configured and sized for allowing the optical component (12) and adjacent strips of optical fiber (14) to deflect under dynamic excitation such as under sinus and impact excitation without contacting the supporting component (54) or adjacent structures.

In order to passivate bounded surfaces and/or to enhance chemical stability during processing and/or to reduce potential by-metallic or environment induced corrosion, the intermediate component (30) and the housing peripheral wall (24) are preferably plated with a layer of Nickel and Gold.

In order to limit lateral deflection adjacent an outlet (76) of the intermediate component (30), the packaging device (10) is optionally further provided with a strain relief sleeve (78) attached to the intermediate component (30) adjacent the outlet (76). The strain relief sleeve (78) typically has a generally frustro-conical configuration'tapering in a direction leading away from the intermediate component (30).

The strain relief sleeve (78) is typically attached to the intermediate component (30) by an inwardly projecting retaining ring (80) and a corresponding retaining recess (82) formed in the intermediate component (30). An adhesive material may further be used to secure the strain relief sleeve (78) to the intermediate component (30).

In order to further reduce the amount of contaminants and moisture within the housing inner volume (26), a getter-type component (84) is typically positioned within the housing inner volume (26). The getter-type component (84) typically has a generally ring-shaped configuration and is typically attached to a lateral surface of the housing inner volume (26), to a surface of the intermediate component (30) or at any other suitable location.

Optionally, the packaging device (10) may be coated with a suitable moisture and/or gas resistant coating. For example, the packaging device 10 may be coated with a 50 microns thick layer of Panylene C™ or Panylene D™. Panylene C™ is known to be hermetic to Helium and is substantially resistant to water vapor diffusion.

Figure 7A:
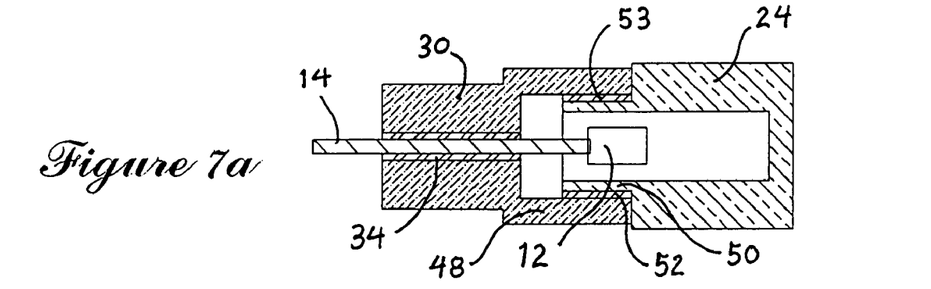
FIG. 7a: in a schematic and partial longitudinal cross-sectional view, illustrates the relationship between some of the sealing components of an optical component packaging device in accordance with an embodiment of the present invention, the components being shown as the packaging device is subjected to a room temperature environment.
Figure 7B:
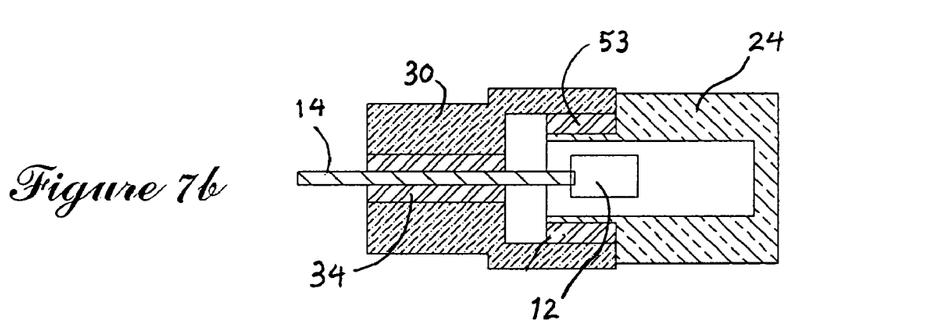
FIG. 7b: in a schematic and partial longitudinal cross-sectional view similar to that of FIG. 7a, illustrates the relationship between some of the sealing components of an optical component packaging device in accordance with an embodiment of the present invention, the components being shown as the packaging device is subjected to a relatively high temperature that allows for curing of adhesive material part of the invention.
Figure 7C:
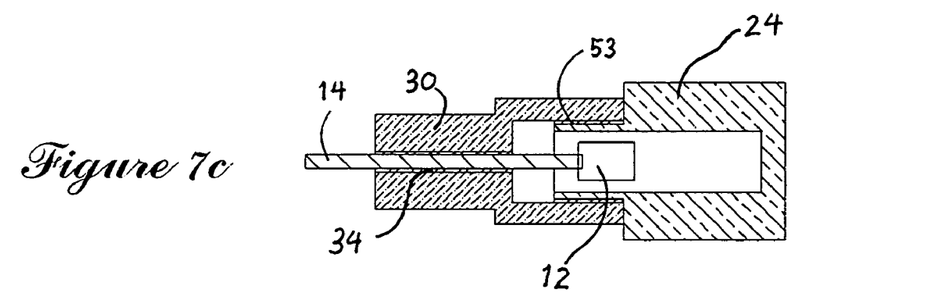
FIG. 7c: in a schematic and partial longitudinal cross-sectional view similar to that of FIGS. 7a and 7b, illustrates the relationship between some of the sealing components of an optical component packaging device in accordance with an embodiment of the present invention, the components being shown as the packaging device is subjected to a relatively low temperature environment.

FIGS. 7A through 7C schematically illustrate the relationship between the intermediate component (30), the sealing component (34) and the strip of optical fiber (14) when the packaging device (10) is subjected respectively to an external environment (16) having respectively a room temperature, a generally high temperature and a generally low temperature. The sealing component (34) is maintained in sealing contact with both the fiber outer surface and the intermediate channel inner surface throughout the temperature cycling. The maintenance of this sealing contact is facilitated by the relationship between the sealing component, the intermediate component and the optical fiber coefficients of thermal expansion.

FIGS. 7A through 7C also schematically illustrate the relationship between the intermediate component (30), the filling material (53) and the housing (22) when the packaging device (10) is subjected respectively to an external environment (16) having respectively a room temperature, a generally high temperature and a generally low temperature. The filling material (53) is maintained in sealing contact with both intermediate component (30) and the housing (22) throughout the temperature cycling. The maintenance of this sealing contact is facilitated by the relationship between the filling material, the intermediate component and the housing coefficients of thermal expansion.

What is claimed is:

1. An optical component packaging device in combination with an optical component optically coupled to a strip of optical fiber, said strip of optical fiber defining a fiber longitudinal axis, said strip of optical fiber being made of an optical fiber material defining an optical fiber coefficient of thermal expansion, said strip of optical fiber including a fiber core surrounded by a fiber cladding coated with a protective jacket, said strip of optical fiber defining a fiber outer surface, said optical component packaging device comprising:

a housing, said housing defining a housing peripheral wall encompassing a housing inner volume, said housing peripheral wall having at least one housing aperture leading into said housing inner volume, said housing being made of a housing material defining a housing coefficient of thermal expansion;

an intermediate component, said intermediate component being substantially sealingly attached to said housing so as to cover said housing aperture, said intermediate component being made of an intermediate component material defining an intermediate component coefficient of thermal expansion, said intermediate component being provided with a generally encompassing intermediate component channel extending therethrough, said intermediate component channel defining an intermediate channel inner surface and an intermediate channel longitudinal axis;

said housing aperture and said intermediate component channel being configured, sized and positioned so as to allow said strip of optical fiber to extend from a position located inside said housing inner volume to a position located outside said packaging device while defining a fiber-to-channel spacing between said fiber outer surface and said intermediate channel inner surface;

a sealing component in sealing contact with both said fiber outer surface and said intermediate channel inner surface, said sealing component being made of a sealing component material defining a sealing component coefficient of thermal expansion; and the optical fiber material is as to have the coefficient of thermal expansion of the strip of optical fiber not greater than the coefficient of thermal expansion of the sealing component and the sealing component material is chosen so as to have the coefficient of thermal expansion of the sealing component not greater than the coefficient of thermal expansion of the intermediate component.

2. A combination as set forth in claim 1 wherein, said sealing contact of said sealing component with said fiber outer surface and said intermediate channel inner surface is adapted to exert a compressive force on said sealing component.

3. A combination as set forth in claim 2 wherein said intermediate component coefficient of thermal expansion is greater than said optical fiber coefficient of thermal expansion.

4. A combination as set forth in claim 1 wherein, said sealing contact of said sealing component with said fiber outer surface and said intermediate channel inner surface is adapted to produce a reduction in the tensile stress at the adhesion interface of said sealing component.

5. A combination as set forth in claim 1 wherein, said sealing component coefficient of thermal expansion is greater than said optical fiber coefficient of thermal expansion.

6. A combination as set forth in claim 1 wherein, said intermediate component coefficient of thermal expansion is greater than to said sealing component coefficient of thermal expansion.

7. A combination as set forth in claim 1 wherein, said intermediate component channel defines a sealing section along which said sealing component is in sealing contact with both said fiber outer surface and said channel inner surface, said scaling section defining a sealing section opening area and a sealing section length, the ratio of said sealing section opening area to said sealing section length being minimized so as to reduce water ingress through said sealing component in said sealing section.

8. A combination as set forth in claim 7 wherein, the value of said sealing section opening area is generally close to the value of said optical fiber diameter and the ratio of said sealing section opening area to said sealing section length has a value of approximately 1/10.

9. A combination as set forth in claim 1 wherein, said intermediate component channel defines a sealing section along which said sealing component is in sealing contact with both said fiber outer surface and said channel inner surface, said strip of optical fiber extending in said sealing section being at least partially deprived of said protective jacket over at least a jacketless section thereof, whereby said sealing component contacts at least a portion of said fiber cladding over said jacketless section.

10. A combination as set forth in claim 9 wherein, said jacketless section extends generally throughout said sealing section, said fiber outer surface of said strip of optical fiber extending in said sealing section being deprived of said protective jacket generally over its full length, whereby said scaling component sealingly contacts said fiber cladding generally over the full length of said sealing section.

11. A combination as set forth in claim 1 wherein, said intermediate component is provided with an intermediate component attachment section and said housing is provided with a housing attachment section, said intermediate component attachment section and said housing attachment section being configured, sized and positioned so as to be in a generally overriding relationship relative to one another, said intermediate component being attached to said housing by a retaining force exerted between said intermediate component attachment section and said housing attachment section.

12. A combination as set forth in claim 11 wherein, said retaining force is generated, at least in part, by an adhesive link created by an intermediate component-to-housing adhesive material positioned between said intermediate component attachment section and said housing attachment section.

13. A combination as set forth in claim 12 wherein, said retaining force is further generated, at least in part, by a retaining pressure resulting from a difference between said intermediate component coefficient of thermal expansion and said housing coefficient of thermal expansion.

14. A combination as set forth in claim 13 wherein, said intermediate component attachment section and said housing attachment section are configured so as to collaborate in creating a filling receiving volume, said filling receiving volume being substantially filled with an intermediate component-to-housing filling material, said intermediate component-to-housing filling material having adhesive properties and being in substantially sealing contact with at least a portion of both said intermediate component attachment section and said housing attachment section.

15. A combination as set forth in claim 13 wherein, said intermediate component attachment section and said housing attachment section are configured so as to collaborate in creating an filling receiving volume, said filing receiving volume being substantially filled with a generally compliant intermediate component-to-housing filling material, said intermediate component-to-housing filling material being in substantially sealing contact with at least a portion of both said intermediate component attachment section and said housing attachment section.

16. A combination as set forth in claim 1 in which said strip of optical fiber is in alignment relative to said intermediate component channel so that said fiber longitudinal axis extends in a generally parallel relationship relative to said intermediate channel longitudinal axis.

17. A combination as set forth in claim 16 which includes a supporting component mounted within said housing inner volume, said supporting component defining a supporting surface for supporting a supported section of said strip of optical fiber.

18. A combination as set forth in claim 17 wherein, at least a portion of said supported section is secured to said supporting surface.

19. A combination as set forth in claim 17 wherein, said supporting component defines a pair of supporting surfaces for supporting a corresponding pair of supported sections of said strip of optical fiber, said supporting surfaces being in a spaced relationship relative to each other and defining a clearance section therebetween, said strip of optical fiber defining an unsupported section extending between said supported sections and being substantially in register with said clearance section, at least a portion of each of said supported sections being secured to a corresponding supporting surface.

20. A combination as set forth in claim 19 wherein, said clearance section is configured, sized and positioned so as to allow said unsupported section to move in a direction substantially perpendicular to said fiber longitudinal axis over a predetermined range without contacting said intermediate component.

21. A combination as set forth in claim 17 wherein, said supporting component is mechanically coupled to said housing by a supporting component-to-housing coupling means so as to allow a relative movement between said supporting component and said housing in a direction generally parallel to said fiber longitudinal axis.

22. A combination as set forth in claim 21 wherein, said supporting component-to-housing coupling means includes a component-to-housing coupling layer of substantially resilient adhesive material bounding said supporting component to said housing.

23. A combination as set forth in claim 1 further comprising a getter component, said getter component being positioned within said housing inner volume for absorbing moisture and contaminants contained therein.

24. A combination as set forth in claim 1 wherein, said housing peripheral wall and said intermediate component are plated with at least a layer of nickel and gold.

25. A combination as set forth in claim 1 further comprising a strain relief sleeve mounted over a distal end of said intermediate component for limiting the radial deflection of a section of said strip of optical fiber located outside said intermediate component adjacent said distal end thereof.

26. A combination as set forth in claim 1 further comprising a clearance means for creating a predetermined clearance adjacent a section of said strip of optical fiber located inside said housing inner volume, said predetermined clearance allowing lateral deflection of the optical component and adjacent strips of optical fiber under dynamic excitation with reduced risks of contacting adjacent structures.

* * * * *